(12) United States Patent
Cassidy et al.

(10) Patent No.: US 8,503,036 B2
(45) Date of Patent: Aug. 6, 2013

(54) SYSTEM AND METHOD OF IMPROVING IMAGE QUALITY IN DIGITAL IMAGE SCANNING AND PRINTING BY REDUCING NOISE IN OUTPUT IMAGE DATA

(75) Inventors: John Christopher Cassidy, Fairport, NY (US); Francis Tse, Rochester, NY (US); Yingjun Bai, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 1119 days.

(21) Appl. No.: 12/213,688

(22) Filed: Jun. 23, 2008

(65) Prior Publication Data

US 2009/0316213 A1    Dec. 24, 2009

(51) Int. Cl.
*H04N 1/407*     (2006.01)
*G06K 9/34*      (2006.01)
*G09G 5/00*      (2006.01)

(52) U.S. Cl.
USPC ......... 358/3.26; 358/1.9; 358/3.01; 358/3.02; 358/3.06; 382/169; 382/176; 345/612

(58) Field of Classification Search
None
See application file for complete search history.

(56) References Cited

U.S. PATENT DOCUMENTS

| 7,024,039 | B2 * | 4/2006 | Simard et al. | 382/195 |
| 7,227,988 | B2 * | 6/2007 | Curry et al. | 382/166 |
| 7,242,802 | B2 | 7/2007 | Currey et al. | |
| 7,343,046 | B2 | 3/2008 | Curry et al. | |
| 7,782,339 | B1 * | 8/2010 | Hobbs et al. | 345/626 |
| 7,831,108 | B2 * | 11/2010 | Wilensky et al. | 382/283 |

* cited by examiner

*Primary Examiner* — Steven Kau
(74) *Attorney, Agent, or Firm* — Pillsbury Winthrop Shaw Pittman, LLP

(57) ABSTRACT

A system and method of reducing noise in output image data is provided. Grayscale image data having a plurality of pixels is received and processed. During processing, pixels which may produce noise are identified, and a mask associated with the image data is generated. The mask provides information related to the pixels, such as opaque and transparent regions for overlaying the pixels. The image data and the mask are compressed and stored. The mask assists in preventing the identified pixels from being visible when the image data is output, thereby reducing the noise in the image.

24 Claims, 7 Drawing Sheets

SYSTEM AND METHOD OF IMPROVING IMAGE QUALITY IN DIGITAL IMAGE SCANNING AND PRINTING BY REDUCING NOISE IN OUTPUT IMAGE DATA

BACKGROUND

1. Field

The present disclosure is generally related to a method of improving image quality in digital printing or scanning. More specifically, the present disclosure relates to a method of reducing noise in output image data manipulated by segmentation processes such as mixed-raster content (MRC).

2. Description of Related Art

Image data comprises a number of pixels, each pixel corresponding to a defined location in the image. The pixels have a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, black (represented by the number "1") or white (represented by the number "0"). Images that have a large range of shades are referred to as grayscale images. For example, grayscale images have an 8-bit value (or higher) per pixel comprising 256 tones or shades of gray for each pixel in the image (gray level of 0 to 255). Grayscale image data may also be referred to as continuous tone or contone image data. In some instances, it is possible to create the impression of a continuous tone image by using a process such as halftoning, such that the image data is converted and "appears" to be a continuous tone image. The halftone process is generally known, and various methods for halftoning exist.

The intensity of a pixel is expressed within a given range, between a minimum and a maximum (inclusive), from 0 (total presence of color or gray level, i.e., white) and 1 (total absence of color or gray level, black), with any fractional values in between. When outputting image data to an output device (e.g., copier, printer, or multi-function device (MFD)), a percentage scale may be used to identify how much ink is employed for a print job. For example, when printing in halftone, the amount of ink or toner supplied may be between 0% (or none)(i.e., pure white) and 100% (i.e., solid black), inclusive.

Additionally, before image data is output to a digital output device, the image data must be compressed, i.e., coded to minimize the space needed to store and output the image data. In particular, due its large size, digital image data that is output to a device such as a multi-function printer (e.g., for copying and/or printing) demands that images be compressed. For color or grayscale image data that is to be compressed, conversion of such image data to binary image data is generally not sufficient.

Generally, the compression process of image data may be referred to as "lossless" (also referred to as "reversible" or "noiseless") if the reconstructed image is substantially identical to the original. Alternatively, if the reconstructed image is not identical to the original (i.e., if the reconstructed image is of inferior quality, though not necessarily detected visually), the compression process may be referred to as "lossy" compression. Because lossless compression often does not yield a file size that is small enough for output devices or systems (e.g., copy and print systems), lossy compression is typically used.

One known popular technique for manipulating and compressing digital image data using lossy compression is a standard known as JPEG image format. However, when images are compressed using JPEG format to a smaller file size, the quality of the image data can be severely degraded. For example, color or grayscale image data may be compressed using JPEG compression techniques; however, this type of compression usually produces noise (or fringe) around or near the color parts of an output image. Additionally, though lossy methods such as JPEG may provide acceptable compression for varying contone or grayscale image data, lossy methods tend not to work well on binary image data comprising sharp edges or transitions, thus also creating noise. In particular, JPEG compression tends to produce noise around edges of lines and text in image objects. To reduce the noise for image data compressed in JPEG format, one current solution is to reduce the amount of compression of the image data. However, reducing the amount of compression typically produces an undesirable result of a larger file size.

An alternative technique for manipulating digital image data includes segmentation (or auto-segmentation). Generally, auto-segmentation techniques are known, and are used to select the most appropriate method to render the various object types (e.g., black and white or color images, text, photos, etc.) present in an image. In some segmentation techniques, separation modules are used to detect and separate text from like halftone parts of image data so that text image data may compressed differently as compared to halftone image data. For example, it is generally known in the art that a format such as mixed raster content (MRC) (also referred to as multiple raster content) may be used to manipulate image data. However, such segmentation may be quite complex, as the types of data or objects in the image data must be determined, then separated or divided into segments or planes, and compressed according to the appropriate technique or method.

Therefore, a simpler, yet effective method for compressing and storing image data using segmentation techniques such as MRC, while still reducing noise and the like in the digitally output image, is desirable.

SUMMARY

One aspect of the present disclosure provides a method of reducing noise in output image data. The method includes: receiving grayscale image data having a plurality of pixels; processing each pixel to identify pixels which produce noise in an output image; and generating a mask associated with the grayscale image data, the mask providing information related to the pixels of the image data. The image data and the mask are then compressed and stored. The mask that is generated assists in preventing the identified pixels of the image data from being visible when the image data is output, thereby reducing the noise in the output image.

An aspect of the present disclosure provides an image data processing system. The system includes an input device configured to receive grayscale image data having a plurality of pixels. A processor is configured to process each pixel to identify pixels which produce noise in an output image. A mask generator is configured to generate a mask associated with the grayscale image data. The generated mask provides information relating to the pixels of the image data. A compressor is provided to compress the image data and the mask, and a storage device stores the image data and the mask. The mask assists in preventing the identified pixels of the image data from being visible when the image data is output, thereby reducing the noise in the output image.

Other features of the present disclosure will become apparent from the following detailed description, the accompanying drawings, and the appended claims.

BRIEF DESCRIPTION OF THE DRAWINGS

The patent or application file contains at least one drawing executed in color. Copies of this patent or patent application with color drawing will be provided by the Office upon request and payment of the necessary fee.

DETAILED DESCRIPTION

Figure 1:
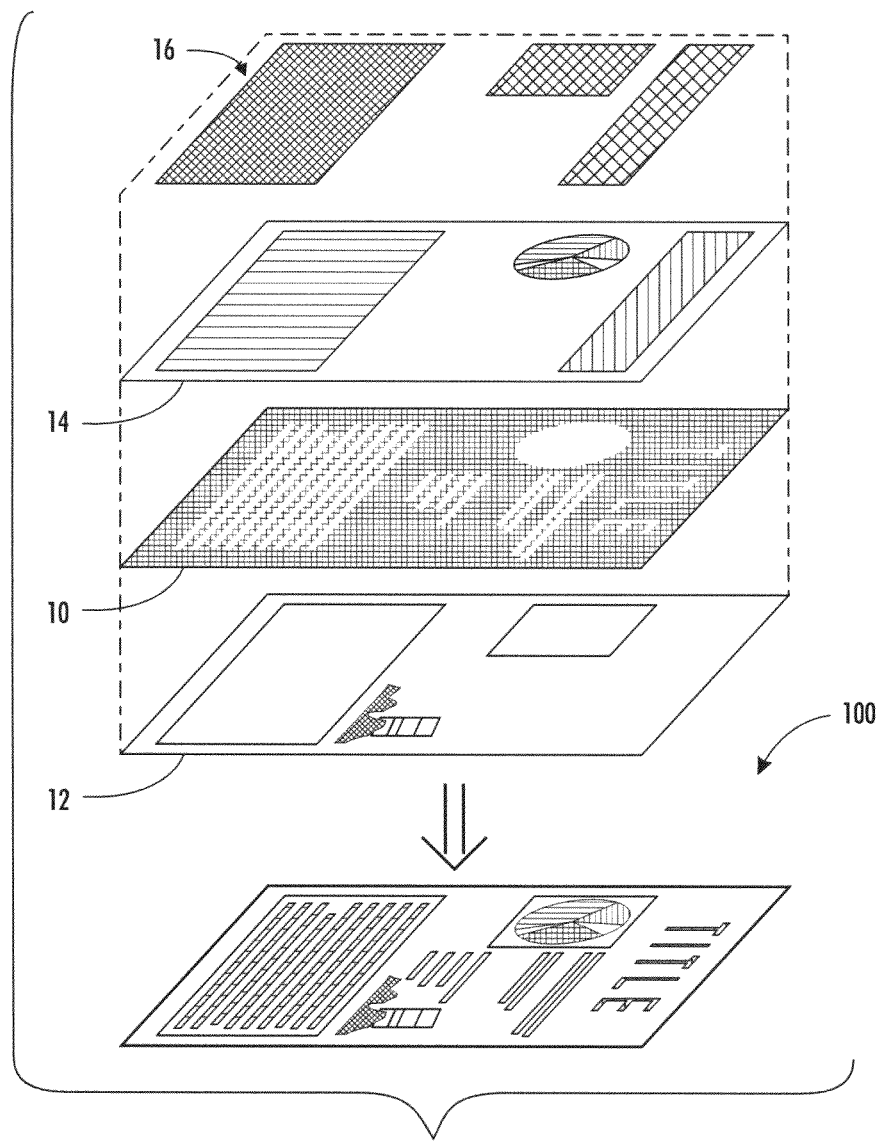
FIG. 1 illustrates an exemplary embodiment of a segmentation technique for compressing image data.

To enhance image features and reduce noise in image data, the image data may be manipulated and/or transformed by identifying the compression needs of the image data. For example, to manipulate image data having different compression needs, different formats may be used, such as mixed raster content (MRC). As noted above, MRC format includes image data in more than one image plane—an approach to satisfying the compression needs of differing types of data—which separates image data into a plurality of planes and separately applies an appropriate compression technique to each image plane. FIG. 1 illustrates an exemplary embodiment of an MRC format or segmentation technique for compressing image data representing a page 100 or document. The image data of the page 100 may be segmented into a plurality of planes including a background plane 12, a foreground plane 14, an associated selector or mask plane 10, and an optional hint plane 16 (sometimes also referred to as a rendering plane). The hint plane may be used to assist the rendering of the page 100 to output the content of page 100 to different displays or marking devices, for example. As is generally known in the art for this type of MRC image format, however, any number N of foreground color and mask plane pairs 14, 10 may be provided. It is also generally known that the foreground plane 14 may comprise a single color. Typically, each plane is used for holding or storing information/image data related to the page 100 or document. For example, the selector or mask plane 10 may be used to store an image of the text and line drawing information. The text may be provided and stored in a binary format. The background plane 12 may typically be used to store contone information such as pictures or photos or varying background colors. The foreground plane 14 may store the color of the text and/or line art. The rendering plane 16 may be used to communicate additional information about the content of the page 100 or document. For example, the rendering plane may include color hints that identify a color matching strategy or halftone data to use for the various objects on the page.

Segmenting the image data of the page 100 into different planes such as those noted above allows for different compression methods to apply to each of the different planes. For example, one exemplary MRC representation specifies that the foreground plane 14 and background plane 12 be JPEG compressed, and the selector plane 10 be ITU-G4 compressed (standard Group 4 facsimile compression). Compression of the rendering plane 16 is optional.

The system and method described herein is a simpler case of segmentation or separation formatting techniques that work particularly well with text and line art image data that is either in color or black and white (or both). This disclosure describes a very low level of segmentation processing for compressing, storing, and outputting image data. Such a method and system provides the ability to store images with a reduced amount of (visible) noise around edges of line and textual image data. This disclosure assists in improving image quality of digitally output images, including those having a plurality of different colors. Additional features and advantages of the method and system will become evident throughout the description below.

Figure 2:
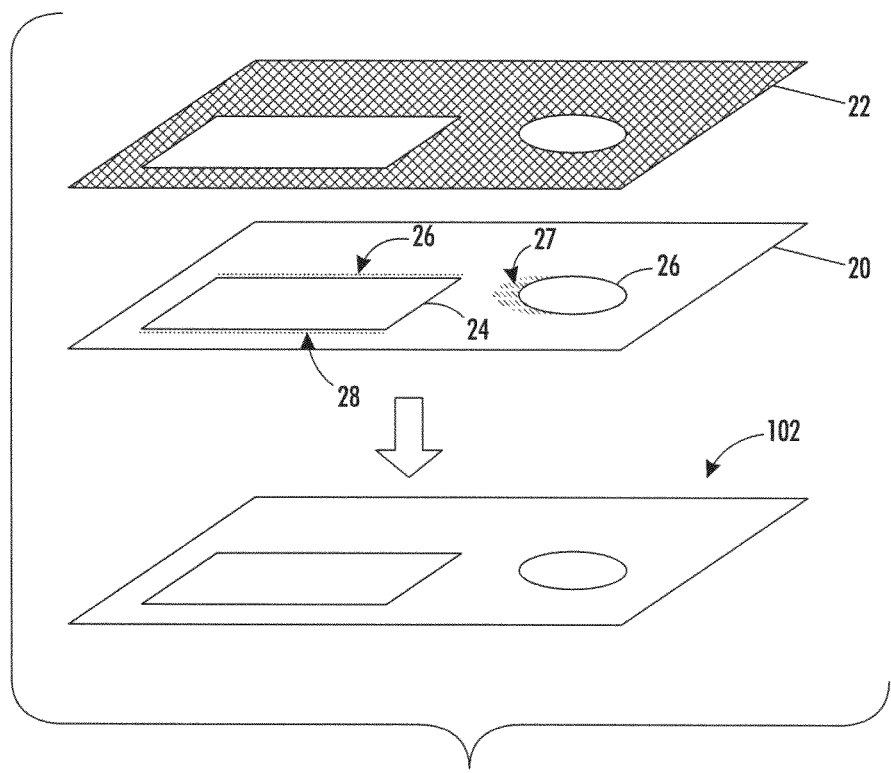
FIG. 2 illustrates an illustrative embodiment of a segmentation technique for compressing image data in accordance with an embodiment of the present disclosure.

FIG. 2 illustrates a simplified segmentation technique for compressing image data. For example, the image data of a page 102 may be segmented into a plurality of planes including an image plane 20 that is compressed. Additionally, a mask plane 22 may be provided. Generally, the image plane 20 represents the image data of page 102 that is received by an input device. The image data comprises a plurality of pixels to be compressed, processed and stored and/or output to an output device. The image data may comprise grayscale or contone image data, for example, and/or binary text or line art image data. For example, the image data of plane 20 may include line art objects 24 and 26.

Before digital image data is stored and/or output, the image data must be compressed. For example, to reduce the size of the image data of page 102 (or a document or the like), the image data may be compressed using a lossy compression technique such as JPEG compression. However, compression techniques such as JPEG compression may produce noise in image objects. "Noise" is defined as pixels in image data having color or gray values that are undesirable, and may be introduced as a defect during the compression or decompression, for example. The noise may be produced during compression of pixels of image data, and may be most noticeable, for example, along the edges of lines and text in image objects. Other known terms in the art such as mosquito noise, fringe, ringing artifacts, and the like are hereby included and defined as noise. Thus, when the image data of a page or document is compressed, the image plane 20 may comprise noise 27 and/or 28 around the edges of the lines of text and/or line art objects.

Thus, a mask plane 22 (also referred to throughout this disclosure as "mask") is generated and associated with the compressed image data of image plane 20. A "mask plane" or "mask" comprises information regarding the pixels of the image data of page 102. Generally, the mask plane 22 comprises information to overlay the image plane 20, such that, upon outputting the image data, the noise 27 and/or 28 of text and/or line art objects in page 102 is substantially reduced or substantially eliminated. Such pixels may be considered as background areas, for example.

More specifically, the mask 22 may be generated so as to cover the noise 27 and/or 28 near the lines or text while leaving the line or text uncovered. For example, the mask may be "transparent" in dark (e.g., solid black), gray, or color areas of text and lines, and "opaque" in background areas (e.g., such as those areas that may be identified in the background plane 12 of FIG. 1). Throughout the disclosure, "transparent" is defined as an area of the mask plane 22 associated with a pixel that is free or uncovered, while "opaque" refers to an area of the mask 22 associated with a pixel that is solid or covered. In an embodiment, opaque or solid areas may be areas that are white in color. The opaque areas may be associated with pixels of the image data that are determined to produce noise near the text or line objects, such that the determined pixels are covered with an overlay. Thus, when the mask plane 22 is associated or applied to the image plane 20, the noise 27 and/or 28 is masked out while leaving the lines or text untouched.

In an embodiment, the mask plane 22 may be generated after processing each pixel (i.e., on a pixel-by-pixel basis) of the input image data; i.e., before any compression is applied to the input image data. In an embodiment, the input image data may be lightly compressed so that no substantial data or information (e.g., related to image plane 20) is lost and no substantial noise is introduced. In an embodiment, the mask 22 may be embedded or linked with the processed image data. In an embodiment, the mask 22 may comprise information similar to processing techniques such as tagging or mapping. For example, the mask plane 22 may associate a tag with a pixel to represent an opaque or a transparent area of the mask. The methods of generating a mask plane 22 should not be limiting. Further description with regard to processing pixels of image data and generating mask 22 are provided below.

The image data of the image plane 20 is compressed after generating the mask plane 22. Generally, any compression technique that is appropriate for compressing grayscale image data may be used. For example, a JPEG compression technique may be used. Additionally, the mask plane 22 may also be compressed. In an embodiment, the image plane 20 and mask plane 22 may be compressed using separate (but appropriate) techniques. For example, the image plane 20 may be compressed using a lossy compression technique, while the mask plane 22 may be compressed using a binary or lossless compression technique. An example of a lossless compression technique may be ITU-G4, JBIG or JBIG2 compression. However, any known technique or combination of techniques may be used in the present method, and, therefore, should not be limited to those described herein.

In an embodiment, the image plane 20 and mask 22 are associated and stored together. For example, to store the mask 22 with the image data 20, the planes 20 and 22 may be stored using page description language such as Portable Document Format (PDF), or any other suitable page description language formats. However, the image plane 20 and 22 may be compressed using different compression techniques. For example, the image plane 20 may be compressed using JPEG compression while the mask plane 22 may be compressed using JBIG2 compression.

Figure 3:
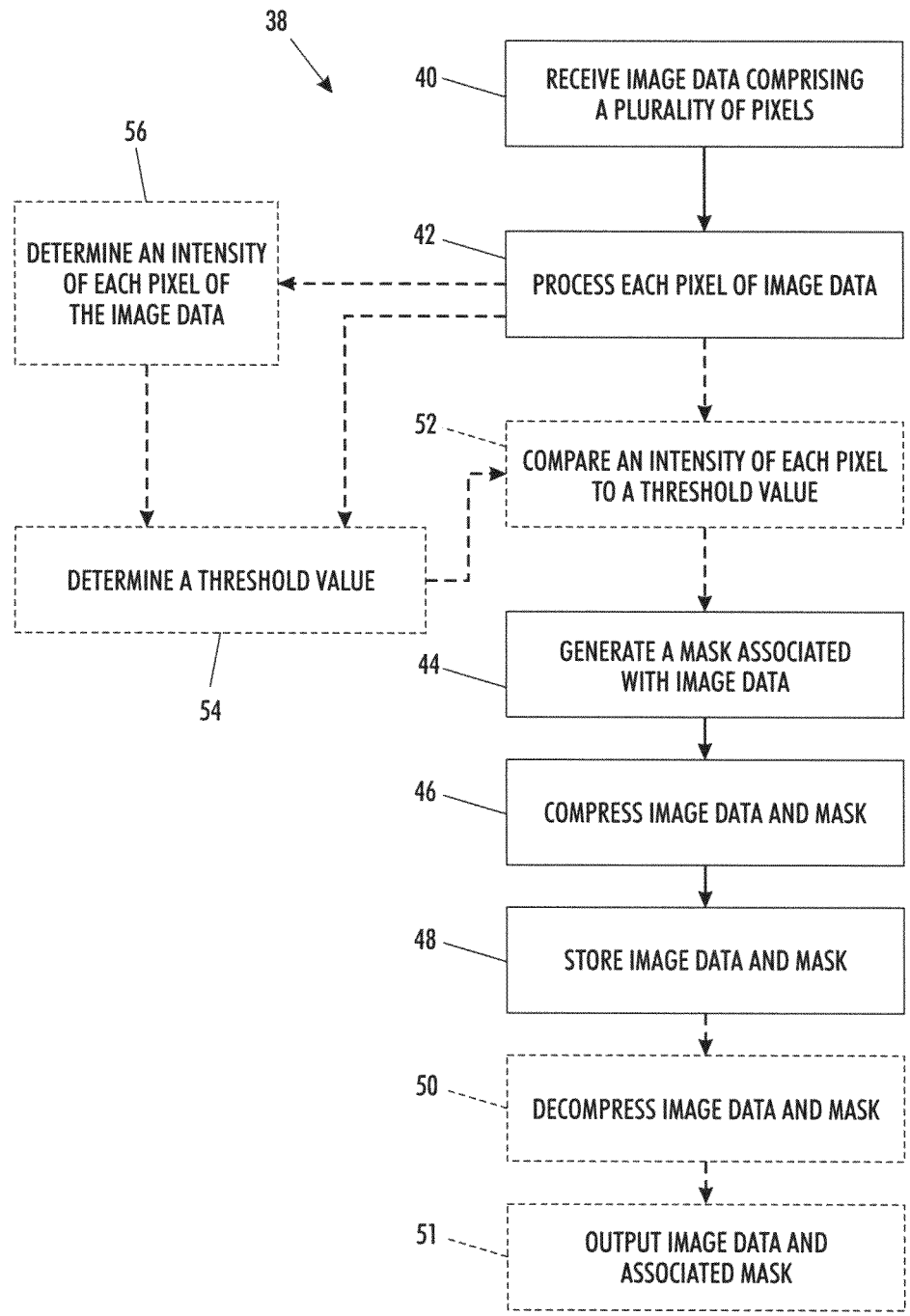
FIG. 3 illustrates a flow chart diagram illustrating a method of reducing noise in image data in accordance with an embodiment of the present disclosure.

FIG. 3 illustrates a flow chart diagram illustrating a method 38 of reducing noise in output image data in accordance with an embodiment. As shown by 40, grayscale image data comprising a plurality of pixels is received. The grayscale image data may be received, for example, by an input device. As described below with respect to FIG. 12, an input device may be any type of device for inputting image data, such as a scanning device, facsimile device, computing device, etc. Each pixel of the grayscale image data is then processed as shown by 42 to identify pixels which may produce noise in an output image. For example, as further described below, the pixel being processed may be identified as a noise producing pixel, or the pixel being processed may be identified as a pixel to be visible while the pixels neighboring the pixel being processed may be identified to produce noise. For example, as also further described below, a threshold comparison of a pixel's intensity or luminance-information may be used to determine which pixels may produce noise. After processing the grayscale image data on a pixel-by-pixel basis, a mask to be associated with the image data is generated as shown by 44. The mask may comprise information related to the pixels of the image data. The mask assists in preventing the identified pixels of the image data from being visible when the image data is output, thereby reducing the noise in the output image. For example, as noted above, the generated mask may contain information to overlay the image data and thus mask or substantially reduce or eliminate pixels which are determined to provide noise in an output image.

After generating the mask 44, the image data and the mask are compressed as shown by 46 and then stored together as shown by 48. The image data and mask may be compressed using different compression techniques (e.g., such as JPEG and JBIG2, as noted above), but stored together. In an embodiment, the mask may be embedded or linked with the compressed image data. In an embodiment, the mask may be provided in the form of tags, i.e., by tagging a pixel. For example, applying a tag to a pixel may represent an area of the mask that may be opaque (i.e., covering or overlaying the pixel). Alternatively, a tag may represent an area of the mask that may be transparent (i.e., allowing the pixel to be output). In an embodiment, the image data and the mask may be stored separately.

In an embodiment, the image data and the associated mask may be decompressed and output to an output device as represented by 50 and 51. An output device may be any type of device that is designed to output the image data and the mask. For example, the output device may display, copy, print, or send the image data. Such an output device may be an MFD, for example. The output device may decompress the image data and the mask before output. Further description with regard to output devices is further provided below with respect to FIG. 12.

In an embodiment, when each pixel is processed 42, the pixel being processed may be identified as a noise producing pixel. For example, as described below, a value of or other information related to a pixel (e.g., intensity, luminance) may be used to determine if that pixel should be identified as associated with a transparent or opaque area of the mask which will be generated. If the pixel being processed is determined to be a pixel which produces noise, the pixel may be an identified pixel. In an embodiment, the pixel being processed may be identified as a pixel to be visible when the image data is output, and the identified pixels comprise pixels neighboring the pixel being processed. For example, if a pixel being processed is determined to be a pixel which will assist in producing a higher quality output image, the neighboring pixels or pixels in its surrounding environment may be identified as pixels that will produce noise in an output image.

When each pixel is processed as shown by 42, the intensity of the pixel may be used as an identification of producing noise in an output image, for example. More specifically, the intensity of a chosen pixel may be processed by comparing the intensity of that pixel to a threshold value, such as shown by 52. In an embodiment, if the intensity of the chosen pixel is greater than the threshold, the area of the mask associated with that pixel is noted as transparent. If the intensity of the chosen pixel is less than the threshold, the area of the mask associated with that pixel is noted as opaque. Thus, the method continues on a pixel-by-pixel basis comparing the intensity of each pixel to the threshold value in order to generate a mask, such as represented by mask layer 22 in FIG. 2, to overlay the image data in the output image.

In an embodiment, luminance information or values of the pixels of the input image data may be used. For example, the luminance information may be compared to a threshold value to determine if the luminance of a chosen pixel is greater than (i.e., darker than) the threshold. In an embodiment, if the luminance of the chosen pixel is greater than the threshold, the area of the mask associated with that pixel is noted as transparent. If the luminance of the chosen pixel is less than the threshold, the area of the mask associated with that pixel is noted as opaque. Thus, the method continues on a pixel-by-pixel basis comparing the luminance of each pixel to the threshold value in order to generate a mask for overlaying the output image data. The property, information, or values associated with pixels that are used to determine transparent and opaque areas for generation of the mask should not be limited to those mentioned herein.

In an embodiment, tags may associated with pixels of the image data to identify opaque areas of the mask. For example, if a property (e.g., intensity, luminance, etc.) indicates that a chosen pixel A is less than a threshold value, pixel A may be tagged, thus indicating that the area of the mask plane associated with pixel A should be opaque. Alternatively, tags may be used to identify areas of the mask that should be transparent. For example, if a property indicates that a chosen pixel B is greater than a threshold value, pixel B may be tagged to indicate that the area of the mask plane associated with pixel B should be transparent. Alternative processing methods, such as mapping, may also be used to assist in generating the mask plane, and should not be limiting.

In an embodiment, further processing may be performed on each pixel to determine if the pixel(s) neighboring the pixel being processed should be identified as noise producing pixels. For example, in one embodiment, if the chosen pixel is compared to the threshold and determined to be within a specific range (e.g., having a value or difference within a range of no more than approximately fifteen (15) to approximately twenty (20) percent (%) as compared to the threshold), the chosen pixel may be associated with a transparent area of the mask while having possible neighboring pixels to be associated with an opaque area of the mask. A tag may be associated with a chosen pixel, for example, to associate opaque areas of the mask to its neighboring pixels.

In another embodiment, a pixel being processed may be further processed by comparing the chosen pixel to one or more of its neighboring pixels to determine noise producing pixels. For example, in an embodiment, if an intensity of a chosen pixel is greater than a threshold, further processing may be performed to determine if pixel(s) neighboring the pixel being processed should be identified as noise producing pixels. In one embodiment, a "rate of change" criteria may be used to determine a relationship between a pixel and neighboring pixels. An example of such criteria may be that the intensity (or other value or information) of the chosen pixel may be then compared with the intensity (or other value or information) of the neighboring pixels. A second threshold value that is similar or different to the first threshold value for the chosen pixel may be used. For example, if the comparison of the intensities (or other value or information) or rate of change is less than a threshold (e.g., the difference in intensities between the chosen pixel and at least one neighboring pixel is less than a threshold, i.e., the neighboring pixel(s) has an intensity that is near the intensity of the chosen pixel), the area of the mask associated with the neighboring pixel(s) may be noted as transparent. Alternatively, a second range value may be used to during the comparison of the pixel with its neighboring pixel(s). For example, if the comparison or difference in intensity values of neighboring pixel(s) is within a range of no more than approximately thirty (30) percent (%), the neighboring pixel(s) may be associated with a transparent area of the mask. In contrast, if the comparison of the pixel and its neighboring pixels is greater than a threshold (e.g., if the comparison or difference in intensity or values is greater than 30%), the area of the mask associated with the neighboring pixel(s) may be noted as opaque.

In another embodiment, neighboring pixels of one or more different colors as compared to the chosen pixel to be processed may be identified pixels (e.g., to be associated with an opaque area of a mask to be generated). The above-described processing methods, however, are exemplary only, and any other processing methods or algorithms may be used to process each pixel of the image.

In an embodiment, the threshold value may be predetermined or preset. In an embodiment, the threshold value may be chosen or determined upon input of the grayscale image data, as illustrated by 54. For example, the threshold value may be dynamically generated locally or globally from the input image data. A user may also determine the threshold value to be used, and provide such value by inputting the value into the output device.

In another embodiment, the threshold value may be determined by local or global statistics of the pixel information of the received grayscale image data. For example, after the image data is received or input as shown by 40, an intensity (or luminance) of each pixel of the image data may be determined as illustrated by 56. After the intensities (or luminances) are determined, a threshold value may be determined 54 based on the intensity values (or luminance values) of the pixels of the image data. In an embodiment, a histogram may be determined locally by an input device.

As an example, pixels of grayscale images have 256 tones or shades of gray for each pixel in the image; thus, the gray level or intensity value may range from 0 to 255. In an embodiment, a user may choose the threshold value to be 128. Therefore, any pixel of the image data whose intensity value is less than 128 will be covered by the mask. In an embodiment, an average or mean intensity value of all of the pixels of the image data may be determined. In an embodiment, an average or mean intensity value may be chosen as a threshold value. In another embodiment, a median value (i.e., the value separating the higher values from the lower values) may be chosen as a threshold value. In an embodiment, a mode value (i.e., the intensity value that occurs most frequently in the pixels) may be chosen as a threshold value. In yet another embodiment, the mean, median, or mode intensity values may be used to determine a threshold value.

In an embodiment, the threshold value may be used to determine a second threshold value. The threshold value may also be used to determine one or more ranges. In an embodiment, the threshold value or range may also be used to determine a relationship between a pixel and its neighboring pixels (e.g., when comparing values to identify if they are within a specified range).

Generally, simpler thresholding methods such as those noted above may be used. However, it should be noted that the method of determining the threshold value should not be limiting. For example, in an embodiment, the thresholding may be supplemented with more complex segmentation methods or algorithms whereby pixels are inspected and grouped together if they meet the threshold criteria and a rate of change criteria whereby a pixel is sufficiently different from its neighboring pixel. Any of such information may be determined locally, such as by a segmentation module 94 in a system 80, for example, as shown and further described with respect to FIG. 12. Examples of segmentation algorithms used to generate MRC images that may be utilized include U.S. Pat. No. 7,242,802, entitled "Segmentation Method and System for Multiple Raster Content (MRC) Representation of Documents," issued Jul. 10, 2007, and U.S. Pat. No. 7,343, 046, entitled "Systems and Methods for Organizing Image Data into Regions," issued on Mar. 11, 2008, both of which are assigned to the same assignee of the present disclosure, and both of which are incorporated herein by reference in their entirety. U.S. Pat. No. 7,242,802, for example, describes the generation of a three-layer MRC image with bands of the image data being process. U.S. Pat. No. 7,343,046 describes a method wherein pixels of similar color and sharp edges are identified and sorted, thus requiring the fall image to be stored in the memory.

Figure 4:
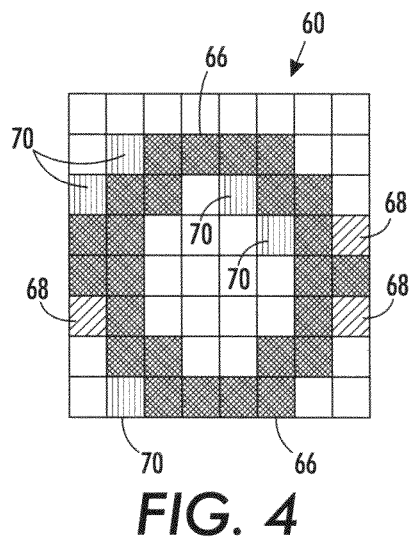
FIGS. 4, 5, and 6 illustrate detailed views of image data, a mask, and output image data, respectively, in accordance with an embodiment of the present disclosure.
Figure 5:
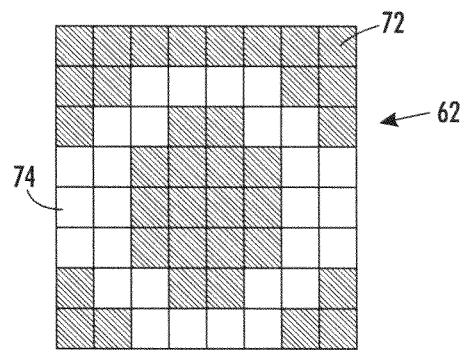
Figure 6:
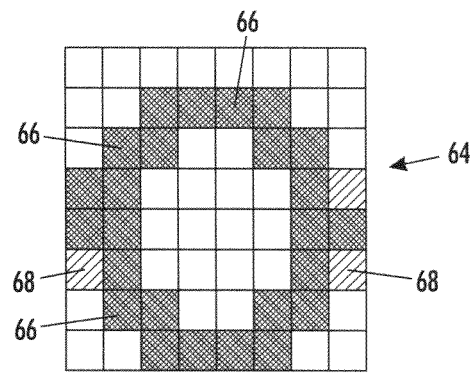

FIGS. 4, 5, and 6 illustrate detailed views of image data, a mask, and output image data, respectively, in an exemplary embodiment. FIG. 4 illustrates an example of a detailed view of a plurality of pixels of grayscale image data 60 that may be input or received and/or compressed (e.g., using JPEG compression). As shown, the pixels comprise a plurality of intensity levels 66, 68, and 70. For example, the pixels may be approximately near 100% intensity (or solid color) such as pixels 66, approximately near 66% intensity such as pixels 68, or approximately near 33% intensity such as pixels 70. As the pixels of the grayscale image data 60 are processed, a mask 62 as shown in FIG. 5 may be generated. As shown, the mask 62 comprises opaque or white areas 72 and transparent or clear areas 74. The opaque areas 72 of the mask are designed to cover those pixels identified as noise, while the transparent areas 74 allow the remaining pixels to be visible. For example, for the image data 60 shown in FIG. 4, the pixels may be compared to a threshold value that may correspond to 60% intensity. Thus, pixels 70 would be covered by the mask 62 when the image data is output, as illustrated in FIG. 6.

The method or technique as herein described may improve image quality by cleaning up some of the noise and artifacts resulting from JPEG compression of grayscale image data (or other lossy compression techniques) while producing a comparable or even smaller file size for storage and output. Also, because the method utilizes a simpler, efficient, and limited segmentation technique, the segmentation defect related image quality issues are reduced or eliminated. Generally, any known separation or segmentation technique may be used; however, using the described simplified segmentation technique with the mask plane (e.g., as illustrated in FIG. 2) provides a simpler algorithm as there is no need to determine which plane the image data should be divided into.

Figure 9:
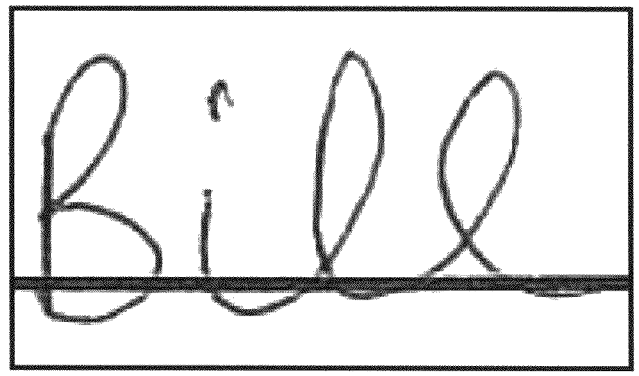
FIG. 9 illustrates an exemplary embodiment of output image data that is produced using known methods.
Figure 10:
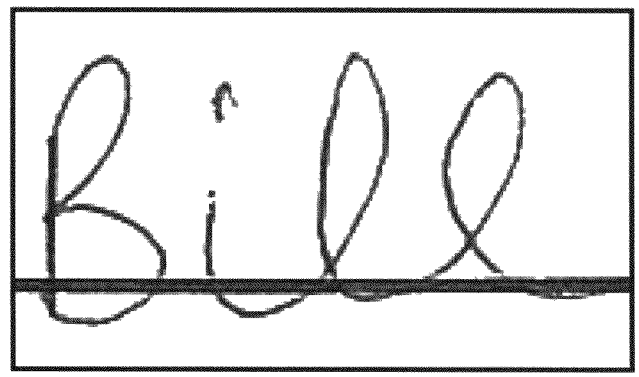
FIGS. 10 and 11 illustrate two embodiments of output image data that are produced in accordance with an embodiment of the present disclosure.
Figure 11:
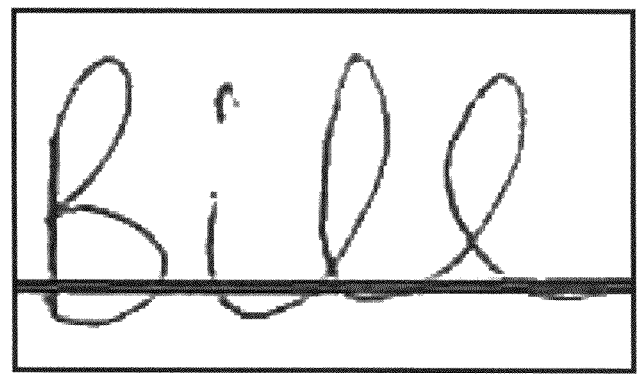

Further, this method only needs to determine whether a pixel is white or not white. For example, in an embodiment where the image data may be segmented into grayscale image data and not grayscale image data (e.g., extraction of pixels with similar color or grayscale value), the pixels of image data have to be separated and compressed in order to generate masks. Alternatively, in other methods, one may have to determine the different types of colors and/or perform some type of color detection and the like. For example, color extraction and quantization of colors may cause image artifacts that can change the appearance of the compressed image. Because the segmentation techniques in this disclosure are simplified, and a simple mask comprising opaque (white) areas is generated to overlay pixels in an image, additional processing to combine and quantize colors is not required, thus resulting in less segmentation artifacts. FIGS. 9-11, for example, illustrate an example of using the method described herein to increase the image quality of images having pixels of several different colors.

In addition, the low level of segmentation processing as provided by the described method may also be used in a color output device when set in a text mode. The method would assist in providing good image quality with a fast scanning alternative.

The method as described herein does not require complicated segmentation, and can operate on a band of an image, such as 16 lines of an image. This capability allows the method or algorithm to have a minimal memory footprint. Thus, this disclosure provides a lower cost algorithm which may be implemented on a low memory platform. For example, unlike more complex or complicated segmentation based algorithms, such as those described in U.S. Pat. Nos. 7,242,802 and 7,343,046 (noted above), the method described herein may utilize much simpler algorithms for MRC image processing and digital printing.

Figure 7:
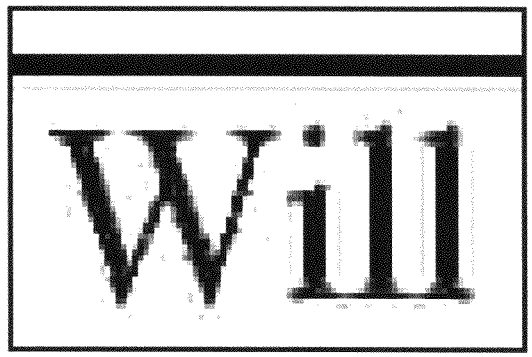
FIG. 7 illustrates an exemplary embodiment of output image data that is produced using known methods.
Figure 8:
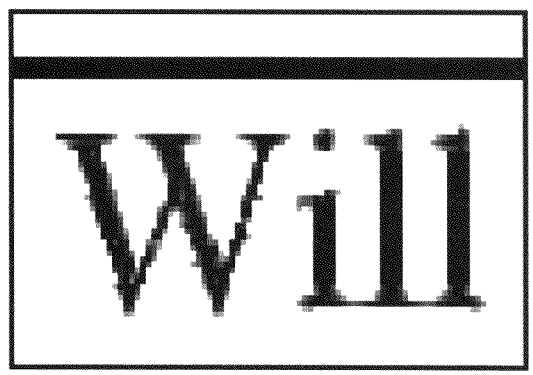
FIG. 8 illustrates an exemplary embodiment of output image data that is produced in accordance with an embodiment of the present disclosure.

FIG. 7 illustrates an example of part of output image data that is produced using known methods such as JPEG compression. As can be seen, the output image quality is degraded by the noise surrounding the edges of the lines of the image or word (that is created during compression). For example, a large number of gray pixels of varying shades or intensities surround the letter "W," thus creating the noise. By overlaying the mask with the image data as described in the present disclosure, the noise is masked out by the opaque areas of the mask, as shown in FIG. 8. Specifically, FIG. 8 illustrates output image data of a PDF image that is produced with JPEG compression of image data and an associated mask. As can be seen, opaque areas of the mask overlay a number of the gray pixels of varying shades that surrounded the letter "W" and others throughout the image. Thus, a higher quality output image is produced.

As a second example, FIG. 9 illustrates part of output image data that was JPEG compressed to a size of 216939 bytes (note that FIG. 9 only shows a very small portion of a complete image). For example, the image shown in FIG. 9 is a colored output image comprising substantially blue ink or toner. Again, such compression may cause noise around the edges of the lines. As shown in FIG. 9, upon compression, several pixels of different colors (e.g., yellow, green) surrounding the blue ink or toner have been output in the image data (e.g., along the side of the letter "B"). In FIG. 10, however, the image data has been compressed, stored, and/or output using the herein described technique, thus compressing the image data to a PDF format with the mask technique. The image data as shown in FIG. 10 compresses the image to a size of 218649 bytes. As can be seen, the image of FIG. 10 has improved image quality with comparable file size. Thus, the neighboring pixels of different colors (e.g., not substantially of a blue ink or toner) are substantially hidden or overlayed by the opaque (white) mask, producing an output image of higher quality. FIG. 11 illustrates the same image at a smaller file size, having a reduced noise and very little degradation in image quality. More specifically, the image data and mask of FIG. 11 is the processed image data with its associated mask which is compressed to a size of 118350 bytes.

Figure 12:
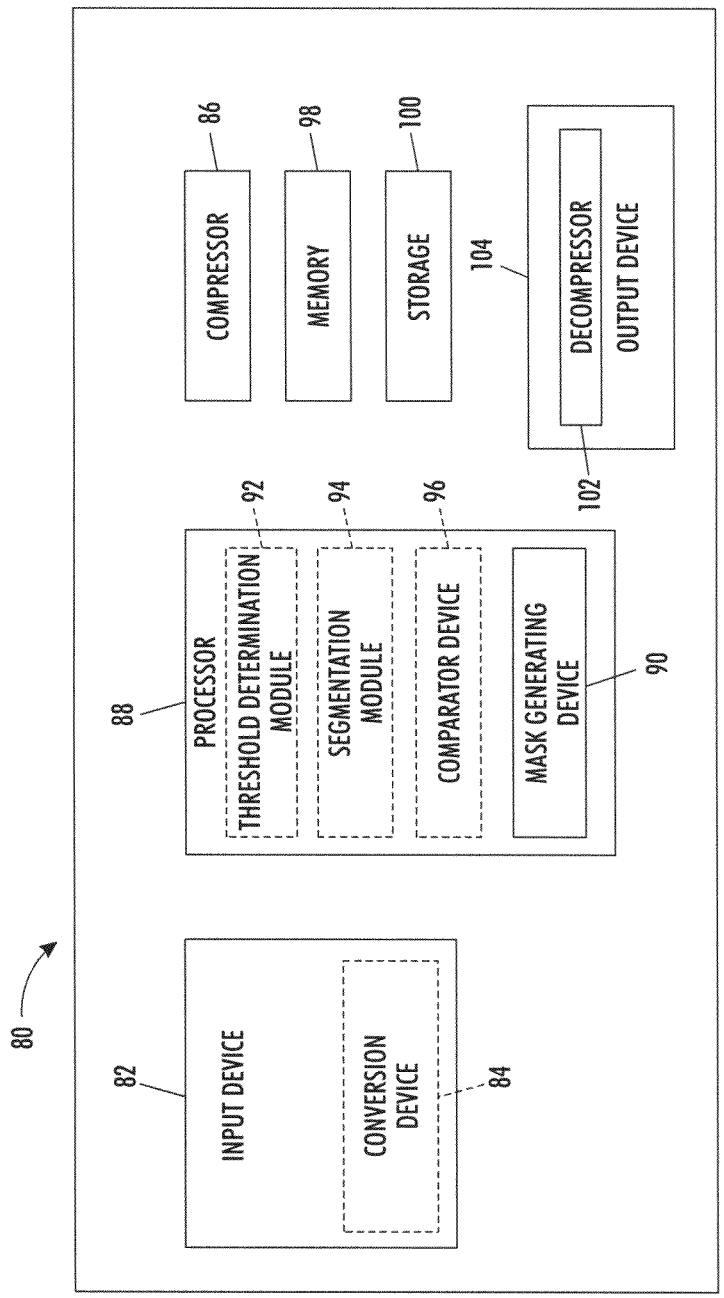
FIG. 12 is a block diagram illustrating an image data processing system that may be used to compress image data and generate a mask in accordance with an embodiment of the present disclosure.

FIG. 12 illustrates a block diagram of an image data processing system 80 that may be used to compress image data and generate a mask in accordance with an embodiment of the present disclosure. For example, the system 80 may comprise an input device 82, a compressor 86, a processor 88, memory 98 or storage 100, and an output device 104. Each of the devices shown in system 80 may also be considered modules, and, therefore, the terms "device" and "module" are used interchangeably herein. The input device 82 is configured to receive image data, such as grayscale image data. The input device 82 may comprise any type of device for receiving and/or inputting image data, such as a scanning device, facsimile device, computing device, copying device, MFD, etc. In an embodiment, the input device 82 may comprise a conversion device 84 for converting the received image data, such as converting grayscale image data from an input device color space, such as RGB (red, green, blue), to a processing color space, such as YCC, where intensity and color information are separated. Generally, the types of color spaces for image data and the conversion of such color spaces is known in the art. The conversion device 84 may be a part of the input device 82 or a separate device or module. At least one compressor 86 is provided in system 80, and is configured to compress the image data received by the input device 82.

A processor 88 is configured to process each pixel of the grayscale image data to identify pixels which may produce noise in an output image. A mask generator 90 configured to generate a mask associated with the image data. In an embodiment, the processor 88 may comprise the mask generator 90, or, alternatively, the processor 88 may generate the mask. Additionally, in some embodiments, a segmentation module 94, a comparator device 96, and/or a threshold determination module 92 may be provided in system 80. Segmentation module 94 may be used to generate the mask plane 22, for example. Additionally and/or alternatively, a comparator device 96 may also be provided in system 80. In another embodiment, the segmentation module 94 may include more thorough processing or examination of the image data. For example, in an embodiment, the segmentation module 94 may determine a rate of change of the pixels of image data, and identify pixels that are not changing fast enough (or sufficiently enough) and thus should not be included in the output image (i.e., and therefore associated with opaque areas of the mask) even if they meet the intensity threshold criteria. In an embodiment, a simple version of a segmentation module 94 may be comparator device 96. Comparator device 96 may be used to compare the intensity of each of the pixels to a threshold, for example. Threshold module 92 may be used to determine the threshold value for processing the image data. For example, threshold module 92 may provide a user-activated threshold value or calculate a threshold value (e.g., based on mean intensities of the pixels), or in some other manner. In an embodiment, mask generator 90 may comprise comparator device 96 and/or threshold module 92 therein.

Memory 98 and/or storage 100 are storage devices for storing the image data and the mask. An output device 104 may be provided to output the image data and the mask. Output device 104 may be any type of device that is designed to output the image data and the mask. For example, the output device may display, copy, print, or send the image data. Such an output device may be an MFD, printer, copier, scanner, facsimile device, display, a terminal, an image storage system, or CPU, for example. In an embodiment, the output device 104 may decompress the image data and the mask before output. In an embodiment, a decompressor 102 is provided in system 80 to decompress the image data and mask before sending the grayscale image data and mask to output device 104. The decompressor 102 and output device 104 may be the same module, or separate modules.

The processor 88 may execute machine readable executable instructions stored in memory 98 or storage 100. For example, the method described herein may be stored in the form of computer executable instructions so as to provide a computer readable media that may be executed by a computer to direct a computer to perform the method to reduce noise in output image data.

It should be noted that each of the above devices or modules shown in system 80 may be connected to, incorporated in, or communicate with any of the other modules and/or modules not shown. The above noted devices or modules of system 80 may also be separate and distinct. Also, the system and method may be used in different applications such as, for example, devices capable of providing output via digital printing for a multitude of purposes, including, but not limited to, xerographic systems, laser printing systems, ink jet printing systems, digital copiers and/or scanners, bookmaking machines, facsimile machines, and multi-function machines.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

What is claimed is:

1. A processor-implemented method of reducing noise in output image data, wherein at least one processor is configured to perform the method comprising:
   receiving grayscale image data comprising a plurality of pixels;
   processing each pixel to identify pixels which produce noise in an output image;
   generating a mask associated with the grayscale image data based on the identified pixels from the processing, the mask comprising information related to the pixels of the image data;
   compressing the image data and the mask,
   storing the compressed image data and the mask, and
   decompressing and outputting the image data and the mask using an output device,
   wherein the mask assists in preventing the identified pixels of the image data from being visible when the image data is output, thereby reducing the noise in the output image.

2. The method according to claim 1, wherein the pixel being processed is identified as a pixel to be visible when the image data is output, and the identified pixels comprise pixels neighboring the pixel being processed.

3. The method according to claim 1, further comprising embedding or linking the mask with the image data.

4. The method according to claim 1, wherein the processing of each pixel to identify pixels is performed by comparing an intensity of each pixel to a threshold value.

5. The method according to claim 4, wherein the mask comprises information relating to pixels determined to have an intensity lower than the threshold value.

6. The method according to claim 1, wherein the processing of each pixel to identify pixels is performed by comparing each pixel to its neighboring pixels.

7. The method according to claim 1, wherein the method further comprises determining a threshold value upon receiving the grayscale image data, and using the threshold value during the processing of each pixel to identify pixels which produce noise in an output image.

8. A method according to claim 7, wherein the method further comprises determining the intensity of each pixel of the grayscale image data, and determining the threshold value based on the determined intensities.

9. A method according to claim 1, wherein the mask comprises pixel-by-pixel metadata.

10. A method according to claim 7, wherein the mask comprises transparent regions and opaque regions, and wherein the transparent regions overlay the pixels determined to be above the threshold value, and the opaque regions overlay the pixels determined to be below the threshold value when the image data is stored or output.

11. A method according to claim 1, wherein the image data and mask are stored using a page description language.

12. An image data processing system comprising:
   an input device configured to receive grayscale image data comprising a plurality of pixels;
   a processor configured to process each pixel to identify pixels which produce noise in an output image;
   a mask generator configured to generate a mask associated with the grayscale image data based on the identified pixels from processing, the mask comprising information relating to the pixels of the image data;
   a compressor for compressing the image data and the mask,
   a storage device for storing the image data and the mask, and
   an output device for decompressing and outputting the image data and the mask,
   wherein the mask assists in preventing the identified pixels of the image data from being visible when the image data is output, thereby reducing the noise in the output image.

13. The system according to claim 12, wherein the pixel being processed is identified as a pixel to be visible when the image data is output, and the identified pixels comprise pixels neighboring the pixel being processed.

14. The system according to claim 12, wherein the mask is embedded or linked with the image data.

15. The system according to claim 12, wherein the output device is selected from the group consisting of: a copier, a printer, a scanner, a facsimile machine, and a multi-function device.

16. The system according to claim 12, wherein the processor processes each pixel by comparing an intensity of each pixel to a threshold value.

17. The system according to claim 16, wherein the mask comprises information relating to pixels determined to have an intensity lower than the threshold value.

18. The system according to claim 12, wherein the processor is configured to determine a threshold value upon receiving the grayscale image data and use the threshold value during processing to identify pixels which produce noise in an output image.

19. The system according to claim 18, wherein the processor is configured to determine the intensity of each pixel of the grayscale image data and determine the threshold value based on the determined intensities.

20. The system according to claim 12, wherein the processor is configured to identify pixels by comparing each pixel to its neighboring pixels.

21. The system according to claim 12, wherein the mask comprises pixel-by-pixel metadata.

22. The system according to claim 18, wherein the mask comprises transparent regions and opaque regions, and wherein the transparent regions overlay the pixels determined to be above the threshold value, and the opaque regions overlay the pixels determined to be below the threshold value when the image data is reproduced.

23. A processor-implemented method of reducing noise in output image data, wherein at least one processor is configured to perform the method comprising:
   receiving grayscale image data comprising a plurality of pixels;
   processing each pixel to identify pixels which produce noise in an output image;
   generating a mask associated with the grayscale image data based on the identified pixels from the processing, the mask consisting of information related to the identified pixels of the image data;
   compressing the image data and the mask, and
   storing the compressed image data and the mask,
   wherein the mask assists in preventing the identified pixels of the image data from being visible when the image data is output, thereby reducing the noise in the output image.

24. A processor-implemented method of reducing noise in output image data, wherein at least one processor is configured to perform the method comprising:
   receiving grayscale image data comprising a plurality of pixels;
   processing each pixel to identify pixels which produce noise in an output image;
   generating a mask associated with the grayscale image data based on the processing, the mask comprising information related to the pixels of the image data and including transparent and opaque regions, the transparent regions configured to overlay pixels in the image data such that they are visible and the opaque regions configured to overlay the identified pixels such that they are prevented from being visible;
   compressing the image data and the mask, and
   storing the compressed image data and the mask,
   wherein the opaque regions of the mask assist in reducing the noise in the image data.

* * * * *